Patented Oct. 5, 1948

2,450,406

UNITED STATES PATENT OFFICE 2,450,406

PROCESS FOR OBTAINING THIOSEMICARBAZIDE

Louis L. Bambas, Grosse Pointe Woods, Mich., assignor to Parke, Davis & Company, Detroit, Mich., a corporation of Michigan No Drawing. Application November 5, 1945,
Serial No. 626,909

8 Claims. (Cl. 260—552)

This invention relates to a new and improved process for obtaining thiosemicarbazide. Thiosemicarbazide, which has the formula

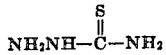

is a valuable intermediate in the preparation of pharmaceuticals.

In the past thiosemicarbazide has been prepared by the reaction of neutral hydrazine sulfate, $(NH_2NH_2)_2 \cdot H_2SO_4$, with potassium thiocyanate in aqueous solution and rearranging the thiocyanic acid salt of hydrazine so formed by heating and evaporating the aqueous reaction mixture. This method possesses the disadvantage that it cannot be used to prepare large amounts of thiosemicarbazide because the rearrangement reaction becomes so rapid that it is impossible to control, thereby resulting in poor yields of the product. Many times the reaction becomes so violent that it is even explosive. This method also has the disadvantage that it is necessary to evaporate the reaction mixture as high as six or seven times in order to obtain satisfactory yields of thiosemicarbazide. Such a procedure is obviously very costly and dangerous, especially since the violent reaction takes place on each evaporation of the mixture. This violent reaction is due to the rearrangement of the intermediate thiocyanate salt of hydrazine to the desired product. This rearrangement reaction is strongly exothermic and when large amounts of materials are employed it even becomes explosive.

One of the objects of this invention is to provide a process which can be used to prepare large amounts of thiosemicarbazide.

Another object of the invention is to provide a process which is readily controlled and which results in uniformly good yields of thiosemicarbazide.

Still another object of the invention is to provide a process for the preparation of thiosemicarbazide in which the product can be easily isolated.

I have found that the above objects may be realized by reacting neutral hydrazine sulfate, $(NH_2NH_2)_2 \cdot H_2SO_4$, with an alkali metal thiocyanate in water and then rearranging the intermediate thiocyanic acid salt of hydrazine by heating it in a suitable organic solvent. Such solvents are water-miscible alcohols, lower alkoxy substituted water-miscible alcohols and water-miscible ethers. Some examples of these solvents are 2-methoxyethanol, 2-ethoxyethanol, n-propanol, ethylene glycol diethyl ether, dioxane and the like. By using a water-miscible organic solvent the normally violent rearrangement reaction can be easily controlled to give good yields of almost pure thiosemicarbazide. Preferably, the reaction mixture should be substantially anhydrous, but it may contain up to about 15% of water. Another important advantage of my new process is that it can be used to prepare large quantities of thiosemicarbazide cheaply due to the fact that the product separates from the reaction mixture in almost the pure state and thereby eliminating costly and uncontrollable evaporation steps.

In carrying out my new process, I first add a concentrated aqueous solution of an alkali metal thiocyanate to a concentrated aqueous solution of neutral hydrazine sulfate. I then filter the mixture to remove the alkali metal sulfate and add the filtrate to the water-miscible organic solvent. Alternatively, the reaction mixture may be added directly to the water-miscible organic solvent and the alkali metal sulfate filtered off. In either case the water is distilled off the reaction mixture, the water-miscible organic solvent solution heated to rearrange the intermediate salt, cooled and the product collected. The product as it separates from the reaction mixture is practically pure and is suitable for most synthetic purposes.

The invention is illustrated by the following examples.

Example 1

A solution of neutral hydrazine sulfate is prepared by dissolving 900 g. of hydrazine hydrate in 900 cc. of water and then adding 1988 g. of hydrazine sulfate, $NH_2NH_2 \cdot H_2SO_4$. The resultant neutral hydrazine sulfate solution is treated with a warm aqueous solution of 2970 g. of potassium thiocyanate in 1000 cc. of water and the mixture allowed to stand until cool. The potassium sulfate which separates is filtered off and the filtrate added to 10 liters of cellosolve, 2-ethoxyethanol, and the additional potassium sulfate which separates filtered off. The cellosolve filtrate is heated to boiling, thereby distilling off most of the water. Boiling begins at about 110° C. and the distillation is continued until the temperature of the material in the still pot reaches approximately 130° C. The solution is heated under reflux for two hours, and then cooled with stirring to insure the formation of small crystals. The crystalline thiosemicarbazide is collected by filtration and dried; yield 1700 g.; m. p. 183° C. (The pure material melts at 184° C.)

The thiosemicarbazide prepared in this manner is sufficiently pure to permit its use in the preparation of pharmaceutical products. For example, it may be used in the preparation of 2-thio-5-amino-1,3,4-thiodiazole.

*Example 2*

A warm solution of 2433 g. of sodium thiocyanate in one liter of water is added to an aqueous solution of neutral hydrazine sulfate. (The neutral hydrazine sulfate solution is prepared by dissolving 900 g. of hydrazine hydrate and 1988 g. of hydrazine sulfate, $NH_2NH_2.H_2SO_4$, in 900 cc. of water). The warm solution is allowed to cool and then it is added to 10 liters of 2-methoxyethanol. The sodium sulfate which separates is removed by filtration and the filtrate subjected to distillation until the temperature of the material in the still pot rises to about 130° C. The solution is then refluxed for two hours, cooled and the crystalline thiosemicarbazide which separates removed by filtration. The yield of the product is about 1800 g.; M. P. 181° C.

*Example 3*

A solution of neutral hydrazine sulfate is prepared by dissolving 900 g. of hydrazine hydrate in 900 cc. of water and then addig 1988 g. of hydrazine sulfate, $NH_2NH_2.H_2SO_4$. A warm aqueous solution of 2970 g. of potassium thiocyanate in 1000 cc. of water is added to the neutral hydrazine sulfate solution and the solution allowed to cool. The mixture is added to 10 liters of ethylene glycol diethyl ether and the potassium sulfate which separates removed by filtration. The filtrate is subjected to distillation until the temperature of the material in the still pot reaches about 130° C. or until most of the water is removed. The solution is refluxed for two hours, cooled and the crystalline thiosemicarbazide removed by filtration. The yield is about 1870 g. of material melting at 179° C. If desired, it may be purified by recrystallization from 2-ethoxyethanol, alcohol or water, although for most purposes this is not necessary.

Equally satisfactory results may be obtained by using dioxane as the solvent. In this case, the distillation is continued until the temperature of the material in the still pot reaches about 100° C.

What I claim as my invention is:

1. Process for obtaining thiosemicarbazide of the formula,

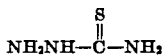

which comprises reacting neutral hydrazine sulfate with an alkali metal thiocyanate in aqueous solution, removing the alkali metal sulfate so formed, rearranging the intermediate thiocyanic acid salt of hydrazine in admixture with a solvent selected from the class consisting of water-miscible alcohols, lower alkoxy substituted water-miscible alcohols and water-miscible ethers until the residual solution contains less than about 15% of water, heating said residual solution to rearrange said intermediate thiocyanic acid salt of hydrazine, cooling the solution and separating the crystalline thiosemicarbazide from said solution.

2. Process for obtaining thiosemicarbazide of the formula,

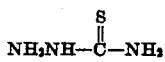

which comprises reacting neutral hydrazine sulfate with an alkali metal thiocyanate in aqueous solution, removing the alkali metal sulfate so formed, rearranging the intermediate thiocyanic acid salt of hydrazine in admixture with a solvent selected from the class consisting of water-miscible alcohols, lower alkoxy substituted water-miscible alcohols and water-miscible ethers until the residual solution contains less than about 15% of water, heating said residual solution at a temperature of above about 100° C. to rearrange said intermediate thiocyanic acid salt of hydrazine, cooling the solution and separating the crystalline thiosemicarbazide from said solution.

3. Process for obtaining thiosemicarbazide of the formula,

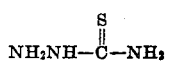

which comprises reacting neutral hydrazine sulfate with an alkali metal thiocyanate in aqueous solution, removing the alkali metal sulfate so formed, rearranging the intermediate thiocyanic acid salt of hydrazine in admixture with a lower alkoxy substituted water-miscible alcohol until the residual solution contains less than about 15% of water, heating said residual solution at a temperature of above about 100° C. to rearrange said intermediate thiocyanic acid salt of hydrazine, cooling the solution and separating the crystalline thiosemicarbazide from said solution.

4. Process for obtaining thiosemicarbazide of the formula,

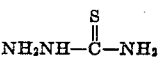

which comprises reacting neutral hydrazine sulfate with an alkali metal thiocyanate in aqueous solution, removing the alkali metal sulfate so formed, rearranging the intermediate thiocyanic acid salt of hydrazine in admixture with 2-ethoxyethanol until the residual solution contains less than about 15% of water, heating said residual solution at a temperature of above about 100° C. to rearrange said intermediate thiocyanic acid salt of hydrazine, cooling the solution and separating the crystalline thiosemicarbazide from said solution.

5. Process for obtaining thiosemicarbazide of the formula,

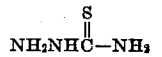

which comprises reacting neutral hydrazine sulfate with potassium thiocyanate in aqueous solution, separating the potassium sulfate so formed, rearranging the intermediate thiocyanic acid salt in admixture with 2-ethoxyethanol until the residual solution contains less than about 15% of water, heating said residual solution at a temperature of above about 100° C. to rearrange said intermediate thiocyanic acid salt of hydrazine, cooling the solution and separating the crystalline thiosemicarbazide from said solution.

6. Process for obtaining thiosemicarbazide of the formula,

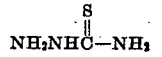

which comprises reacting neutral hydrazine sulfate with sodium thiocyanate in aqueous solution, separating the sodium sulfate so formed, rearranging the intermediate thiocyanic acid salt in admixture with 2-ethoxyethanol until the residual solution contains less than about 15% of water, heating said residual solution at a temperature of above about 100° C. to rearrange said intermediate thiocyanic acid salt of hydrazine, cooling the solution and separating the crystalline thiosemicarbazide from said solution.

7. In a method of making thiosemicarbazide, the steps which comprise adding a relatively large quantity of an organic solvent of the class consisting of water-miscible alcohols, lower alkoxy substituted water-miscible alcohols and water-miscible ethers to an aqueous solution of the reaction product of hydrazine sulfate and an alkali metal thiocyanate containing the thiocyanic acid salt of hydrazine, removing the alkali metal sulfate thereby obtaining a solution containing minor amounts of water, distilling off substantially all the water from the latter solution and heating the remaining solution to form thiosemicarbazide.

8. In a method of making thiosemicarbazide, the steps which comprise adding a relatively large quantity of 2-ethoxyethanol to an aqueous solution of the reaction product of hydrazine sulfate and an alkali metal thiocyanate containing the thiocyanic acid salt of hydrazine, removing the alkali metal sulfate thereby obtaining a solution containing minor amounts of water, distilling off substantially all the water from the latter solution and heating the remaining solution to form thiosemicarbazide.

LOUIS L. BAMBAS.

REFERENCES CITED

The following references are of record in the file of this patent:

UNITED STATES PATENTS

| Number | Name | Date |
|---|---|---|
| 2,055,608 | Lubs et al. | Sept. 29, 1936 |
| 2,086,822 | Schubert et al. | July 13, 1937 |

OTHER REFERENCES

Berichte (Deut. Chem. Gesell), vol. 28 (1895), p. 948, Freund et al.

Berichte (Deut. Chem. Gesell), vol. 29 (1896), pp. 2501 and 2502, Freund et al.

Chem. Abs., vol. 34, p. 991, Cattelain (Comp. Rend. 209 (1939), p. 799 to 801).

Chem. Abs., vol 36, p. 2256, Cattelain (Bull. Soc. Chem. (1940) p. 791–795).